UNITED STATES PATENT OFFICE.

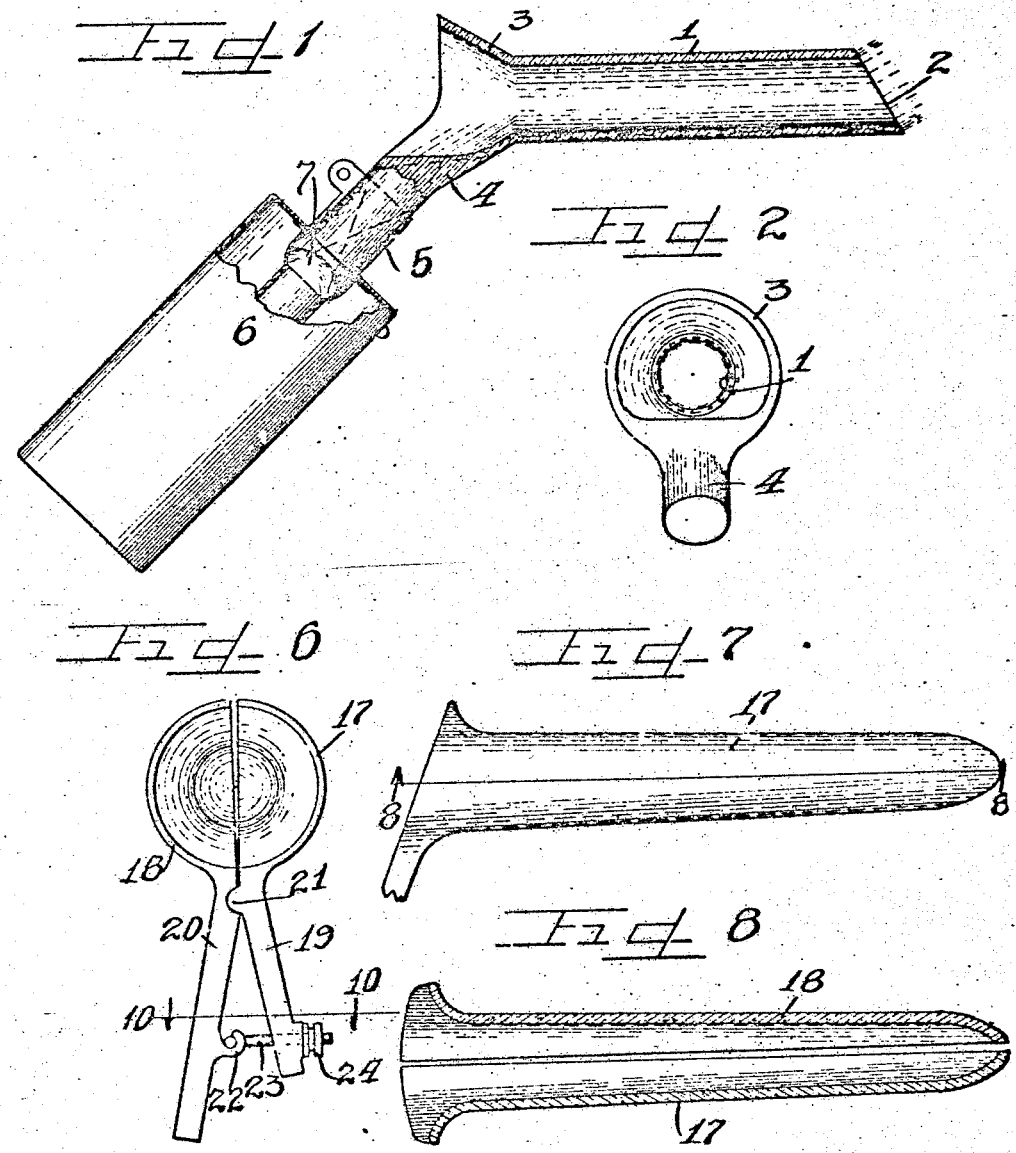

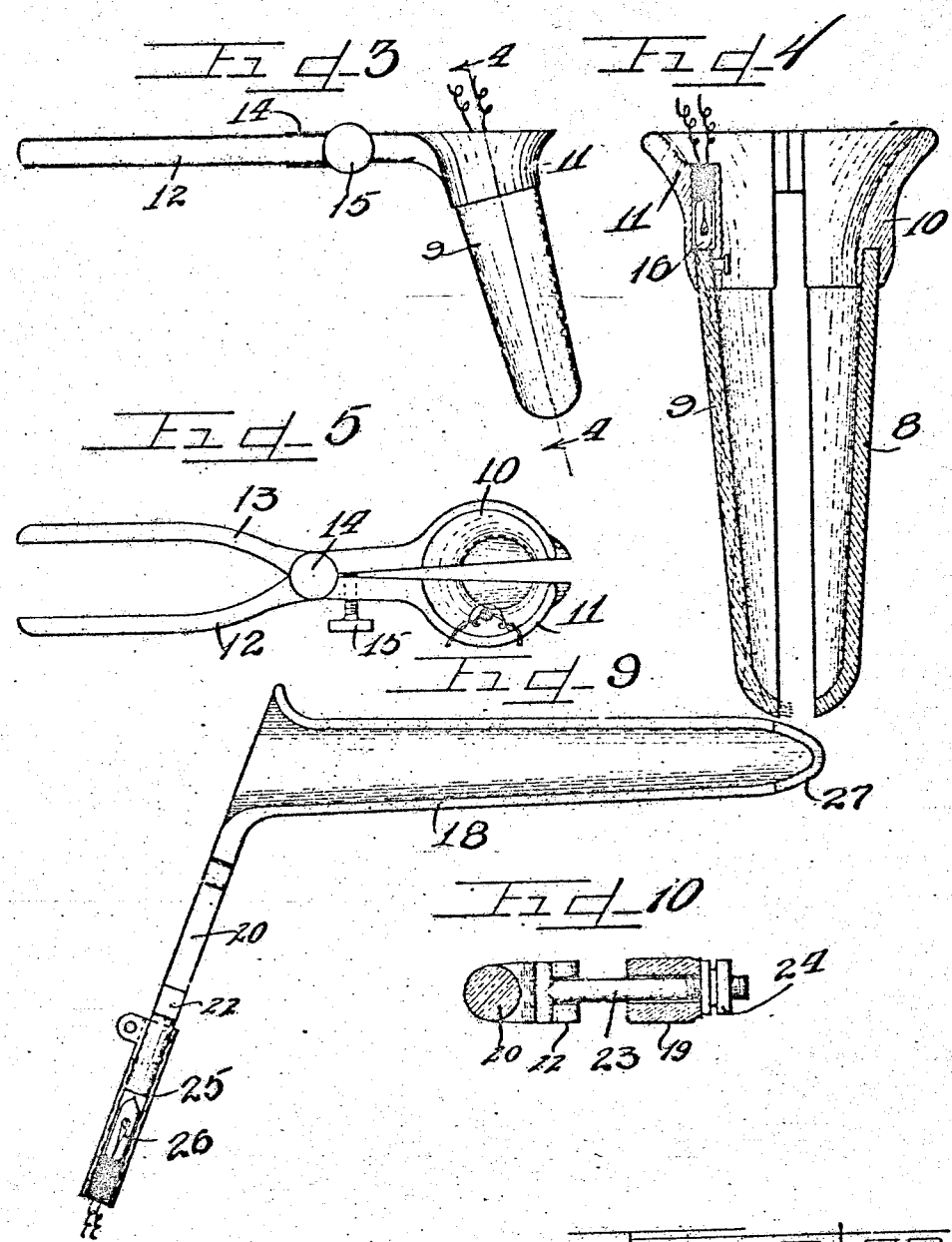

ISAAC J. SMIT, OF CHICAGO, ILLINOIS.

SELF-ILLUMINATED SURGICAL ILLUMINATING-SPECULUM.

1,246,340.  Specification of Letters Patent.  Patented Nov. 13, 1917.

Application filed August 21, 1916. Serial No. 116,179.

*To all whom it may concern:*

Be it known that I, ISAAC J. SMIT, a citizen of the United States, and a resident of the city of Chicago, in the county of Cook and State of Illinois, have invented certain new and useful Improvements in Self-Illuminated Surgical Illuminating-Specula; and I do hereby declare that the following is a full, clear, and exact description of the same, reference being had to the accompanying drawings, and to the numerals of reference marked thereon, which form a part of this specification.

This invention relates to a speculum for surgical purposes, which, instead of being constructed of metal or other opaque material as is usual in this type of devices, is constructed of a transparent material such as glass, and furthermore is designed to transmit light therethrough in a manner whereby the rays of light passing therethrough are invisible to the eye through the side walls of the speculum. Thus a clear vision may be had of the passage into which the speculum is inserted and the light which is transmitted therethrough is emitted or projected therefrom at the end thereof through an emitting surface provided for the purpose. My invention contemplates the use of glass or other transparent medium as the material for the construction of the speculum with th side walls or surfaces of the glass highly polished so that the phenomenon of total internal reflection of the light introduced into the glass speculum may be utilized to transmit the light therethrough without interference of vision through the glass member so that the light transmitted through the glass speculum may be projected from the end thereof through the surface for the purpose.

It is an object therefore of this invention to construct a light transmitting speculum for surgical use wherein light is transmitted from a source associated with the speculum by internal reflection through the glass member thereof for illumination of an object or area at the lower end of the speculum, and furthermore permitting clear vision to be had through the transparent speculum of the passage into which the same is inserted.

It is also an object of this invention to construct a self-illuminating surgical device wherein the source of light is associated with a transparent member so that the light is transmitted therethrough by the phenomenon of internal reflection and emitted from any point desired through an emitting or projecting surface provided.

It is furthermore an important object of this invention to construct a surgical device embracing detachable glass elements for the transmission of light therethrough with a source of light associated therewith whereby clear vision may be had through the elements, the light rays being invisible to the eye, through the side walls or surfaces of the transparent elements, and internally reflected as they pass therethrough being finally emitted through the end thereof to illuminate the object or area desired.

It is finally an object of this invention to construct an improved type of self-illuminated surgical device of transparent material permitting a clear vision to be had therethrough and acting by internal reflection to transmit light therethrough to a point desired.

The invention (in a preferred form) is illustrated in the drawings and hereinafter more fully described.

On the drawings:

Figure 1, is a central vertical section, with parts shown in elevation, of a device embodying the principles of my invention.

Fig. 2, is an end view of the transparent light conducting element detached.

Fig. 3, is a side elevation of a modified form of device.

Fig. 4, is a section therethrough on line 4—4, of Fig. 3.

Fig. 5, is a top plan view of the device shown in Fig. 3.

Fig 6, is a top plan view of another modified form of device.

Fig. 7, is a fragmentary side elevation of the upper portion thereof.

Fig. 8, is a detail section taken on line 8—8, of Fig. 7.

Fig. 9, is a side elevation of one of the transparent members of the speculum shown in Fig. 6, with the lower end thereof in section.

Fig. 10, is a detail section taken on line 10—10, of Fig. 6.

As shown on the drawings:

Referring first to the construction illustrated in Figs. 1 and 2, a speculum is shown as consisting of a cylindrical transparent glass member 1, with the end surface thereof beveled off, as denoted by the reference numeral 2, and with the other end thereof flanged outwardly as denoted by the reference numeral 3, and provided with a solid cylindrical glass extension 4. Said solid cylindrical extension 4, is inserted into a tubular clamping sleeve 5, formed on the end of a flashlight casing 6, within which is provided an illuminating bulb 7.

In the form of device illustrated in Figs. 3, 4 and 5, the speculum is shown as constructed in two parts, one a rounded glass member 8, substantially semi-cylindrical in section, and tapering toward its lower end, and the other of similar construction denoted by the reference numeral 9. Said members 8 and 9, are secured in metal or composition outwardly flanged rounded or horn-shaped jaw members 10 and 11, respectively, which are provided with handle extensions 12 and 13, respectively, pivotally connected by means of a pintle 14. A set screw 15, is threaded through the extension on the jaw member 11, to contact with the opposite extension on the jaw member 10, as shown in Fig. 5, to limit the closing movement of said members, or in other words, to maintain the same separated the desired amount.

Inserted and secured within the jaw member 11, as clearly shown in Fig. 4, is an electric bulb 16, adapted to receive current from any suitable source, and with the light rays therefrom constrained to pass into the upper end of the glass member 9, to be transmitted therethrough by internal reflection owing to the highly polished walls or surfaces of said glass member, and to be emitted at the lower end thereof.

In the form of device illustrated in Figs. 6 to 10, inclusive, I have shown an expansible speculum consisting of two parts constructed entirely of glass or other clear transparent medium, one member denoted by the reference numeral 17, and the other by the reference numeral 18, and each having a handle extension, which are denoted respectively by the reference numerals 19 and 20. Said respective members 17 and 18, are pivotally connected to one another, one thereof having a pivot projection 21, engaging in a complemental recess in the other thereof, as clearly shown in Fig. 6, so that a pivotal movement may be had when the two are assembled and inserted into a passage when it is desired to expand the respective members 17 and 18.

In order to impel the respective glass speculum members 17 and 18, apart after insertion thereof into a passage to be operated upon or examined, a hook 22, is formed on the handle 20, of one of said members and engaged therein is a threaded T-headed bolt 23, which extends into an aperture in the handle 19, and is provided with a threaded nut 24, which, when threaded inwardly thereon, serves to draw the respective handle members 19 and 20, toward one another to expand the members 17 and 18, from one another about the pivot lug or projection 21. Clamped upon the lower end of the handle member 20, is a cylindrical element 25, within which is mounted an electric bulb 26, the light from which strikes upon the lower flat end surface of said glass handle member 20, and proceeds upwardly therethrough and is distributed through the member 18, passing entirely there rough by internal reflection to the outer or lower end surface thereof denoted by the reference numeral 27, shown in Fig. 9, from which it is projected to objects adjacent thereto.

The operation is as follows:

Referring first to the construction illustrated in Figs. 1 and 2, the rays of light from the illuminating bulb 7, pass upwardly through the cylindrical extension 4, of the speculum, and are distributed therethrough and pass by internal reflection to the outer end surface 2, thereof, from which they are emitted or projected.

In the construction illustrated in Figs. 3, 4 and 5, the rays of light from the lamp 16, pass into the transparent speculum member 9, and travel therethrough by internal reflection to the inner end surface thereof from which they are emitted, although a very small portion of the light may be emitted along the side edges of said speculum members if, in the reflection of the rays, any of the rays strike said surface at an angle less than the critical angle of glass with respect to air, and then pass therethrough and are not reflected inwardly again.

In the form of device illustrated in Figs. 6 to 10, the rays of light pass upwardly through the handle portion 18, and are distributed through the speculum member 18, and pass by internal reflection therethrough to the end thereof, and are emitted through the projection surface 27, at the end thereof.

In all of the constructions described, the glass members are of a high quality of clear glass so that objects are easily discernible therethrough, and minute examination of the passage in which the speculum is inserted may be made. The rays of light passing through the glass members of the different forms of speculums are entirely invisible to the eye owing to the fact that none of the rays are emitted through the side walls of the speculum members, but are internally reflected in their passage therethrough until emitted to illuminate the region under exploration at the inner end of the speculum.

The phenomena of internal reflection of light introduced into the transparent members of the different forms of specula shown takes place due to the fact that the rays of light are not allowed to strike any of the highly polished side walls or surfaces of said speculum member at an angle less than the critical angles for glass and air media, and thus continue their traverse through said transparent members until they strike the emitting or projecting surface at the lower end thereof.

I am aware that the details of construction may be varied through a wide range without departing from the principles of this invention, and I therefore do not purpose limiting the patent granted otherwise than necessitated by the prior art.

I claim as my invention:—

1. A self-illuminated speculum, comprising a tubular body formed of glass, and illuminating means located in a plane with the body of said glass at the rear end thereof, and so disposed that the rays of light therefrom will traverse said glass at one side by internal reflection for emission at the front end thereof.

2. A self-illuminated speculum, comprising glass members expansible from one another, and an illuminating means located in a plane with the body of one of said members at the rear end thereof and so disposed as to admit light thereinto for traverse therethrough by internal reflection to be emitted at the other end thereof.

3. A self-illuminated speculum, comprising a tubular body portion formed of glass, a solid extension of glass integral therewith and disposed at an angle thereto, and illuminating means disposed in line with the rear end of said extension, whereby the rays of light therefrom will traverse said extension and said body portion at one side by internal reflection for emission at the front end of the device.

In testimony whereof I have hereunto subscribed my name in the presence of two subscribing witnesses.

ISAAC J. SMIT.

Witnesses:
CHARLES W. HILLS, Jr.,
EARL M. HARDINE.

Copies of this patent may be obtained for five cents each, by addressing the "Commissioner of Patents, Washington, D. C."